United States Patent [19]
Troska et al.

[11] Patent Number: 6,123,967
[45] Date of Patent: Sep. 26, 2000

[54] INCREASED FIBER DIGESTION LIVESTOCK SUPPLEMENT

[75] Inventors: Michael R. Troska; Kenneth P. Munsch, both of Fort Collins, Colo.

[73] Assignee: Cattleman's Choice Loomix, LLC, Johnstown, Colo.

[21] Appl. No.: 09/344,630

[22] Filed: Jun. 25, 1999

Related U.S. Application Data

[60] Provisional application No. 60/090,672, Jun. 25, 1998.

[51] Int. Cl.[7] ........................................................ A23K 1/02
[52] U.S. Cl. .............................. 426/72; 426/74; 426/656; 426/658; 426/807; 426/623; 426/624
[58] Field of Search ............................... 426/72, 74, 656, 426/658, 624, 623, 807

[56] References Cited

U.S. PATENT DOCUMENTS

| | | | |
|---|---|---|---|
| 4,600,586 | 7/1986 | Green | 426/2 |
| 5,709,894 | 1/1998 | Julien | 426/53 |
| 5,863,574 | 1/1999 | Julien | 426/53 |

FOREIGN PATENT DOCUMENTS 9849903  11/1998  WIPO .

OTHER PUBLICATIONS

"Nutrient Requirements of Beef Cattle", National Research Council, p. 43, 1984.

"Nutrient Requirements of Beef Cattle", National Research Council, p. 118, 1996.

Abstract, Effects of Dietary Protein Amount and Ruminal Undergradability of Feed Intake and Growth in Early Weaned Beef Cattle, S.S. Donkin, M.R. Lahrschall, R.P. Lemenager, and M.F. Cecava; Purdue University, West Lafayette, IN., and Consolidated Nutrition, L.C., Fort Wayne, IN.; J. Anim. Sci. 1997 75, 496 (Suppl. 1).

Abstract, The Effect of Feeding Graded Levels of Ruminally Undegradable Protein on the Growth of Sheep and Nitrogen Flow in Continuous Culture; Lusweti, F.N.; Kerley, M., Nelson, C.J., Belyea, R., Spain, J. and Williams, J.; University of Missouri, Columbia; J. Anim. Sci. 1997 75, 496 (Suppl. 1).

Abstract, Digestion of Nitrogenous Compounds by Steers Fed Diets Containing Raw or Extruded Soybeans.; Orias, F., Merchen, R.R., Aldrich, C.G., Elizalde, J.C., and Bauer, L.L.; University of Illinois, Urbana.; J. Anim. Sci. 1997 75, 496 (Suppl. 1).

Abstract, Comparison of Feeding Raw Soybeans Versus Soybean Meal in Steer Finishing Diets.; Marston, T.T., Kreikemeier, K.K., Sartwelle III, J.D.; Kansas State University, Garden City.; J. Anim. Sci. 1997 75, 496 (Suppl. 1). Cottonseed Meal or Feather Meal Supplementation of Ammoniated Tropical Grass Hay for Yearling Cattle, W.F. Brown and F.M. Pate; Range Cattle Research and Education Center, University of Florida, Ona 33865; J. Anim. Sci. 1997. 75:1666–1673.

Effect of Increasing Proportion of Supplemental Nitrogen from Urea on Intake and Utilization of Low-Quality, Tallgrass–Prairie Forage by Beef Steers, H.H. Koster, R.C. Cochran, E.C. Titgemeyer, E.S. Vanzant, T.G. Nagaraja, Kreikemeier, and G. St.Jean; Department of Animal Sciences and Industry, Kansas State University, Manhattan 66505–1600; J. Anim. Sci. 1997. 75:1393–1399.

Interactions Between *Fibrobacter Succinogenes, Prevotella Ruminicola*, and *Ruminococcus Flavefaciens* in the Digestion of Cellulose from Forages, M. Fondelvila and B.A. Dehority; Department of Animal Sciences, Ohio Agricultural Research and Development Center, The Ohio State University, Wooster 44691–4096; J. Anim. Sci. 1996. 74:678–684.

Effect of Direct–Fed Fibrolytic Enzymes On The Digestive Characteristics Of A Forage–Based Diet Fed to Beef Steers, G.E. Lewis, C.W. Hunt, W.K. Sanchez, R. Treacher, G.T. Pritchrd, and P. Feng; Department of Animal and Veterinary Science, University of Idaho, Moscow 83844 and FinnFeeds International, Marlborough, Wiltshire, U.K.; J. Anim. Sci. 1996. 74:3020–3028.

Abstract, In Vitro Stimulation of Forage Fiber Degradation By Ruminal Microorganisms With *Aspergillus Oryzae* Fermentation Extract, Varel Vincenth, Kreikemeier Kell, and Jung Hans–Joachi; Agricultural Research Service, USDA TEKTRAN, May 26, 1998.

Abstract, Response To Feeding Various Levels of *Aspergillus Oryzae* Fermentation Extract On Ruminal Metabolism In Cattle, V.H. Varel and K.K. Kreikemeier; Agricultural Research Service, USDA TEKTRAN May 26, 1998.

*Primary Examiner*—Chhaya D. Sayala
*Attorney, Agent, or Firm*—Santangelo Law Offices, P.C.

[57] ABSTRACT

This invention provides a unique livestock supplement which has characteristics that favor the enhanced digestion of fiber consumed by livestock, particularly ruminants such as cattle. The enhanced digestion may be due to a unique combination of selected ingredients that have been proven to increase the amount of fiber that a ruminant animal consumes. The order in which these ingredients are included may have a significant impact on the product's ability to perform. The supplement includes a method of consumption control that provides for a more thorough measuring of product intake. The method includes the ability of the product to be fed in a way, which encourages equal access of the product to the livestock. The combination of the ingredients and the method in which the animal consumes these ingredients, along with the access to them, may prove to be the reason for the increase in the amount of fiber a ruminant animal is able to consume while having this supplement available.

12 Claims, 13 Drawing Sheets

CATTLEMAN'S CHOICE LOOMIX, L.L.C.

ORE-BAC   SOUR

| ORDER | INGREDIENT | AMOUNT % |
|---|---|---|
| 1. | UREA SOLUTION 23% | 7.15 % |
| 2. | CONDENSED EXTRACTED GLUTAMIC ACID FERMENTATION PRODUCT | 40.0 % |
| 3. | ORE-BAC CARRIER | 1.05 % |
| 4. | SALT | 2.41 % |
| 5. | MAGNESIUM SULFATE | .25 % |
| 6. | CONDENSED MOLASSES FERMENTATION SOLUBLES | 27.55% |
| 7. | BEET MOLASSES | .467% |
| 8. | PHOSPHORIC ACID | 8.57% |
| 9. | VITAMIN A TO PROVIDE 50,000 IU/LB | |
| 10. | VITAMIN D TO PROVIDE 12,500 IU/LB | |
| 11. | VITAMIN E TO PROVIDE 50 IU/LB | |
| 12. | HYDROCHLORIC ACID (32%) AS NEEDED TO PROVIDE A FINAL pH OF .8 - 1.5 | |

ORE-BAC   SWEET

| ORDER | INGREDIENT | AMOUNT % |
|---|---|---|
| 1. | WATER | 20.38 % |
| 2. | UREA SOLUTION 23% N | 1.83 % |
| 3. | AMMONIUM POLYPHOSPHATE (10-34-0) | 1.05 % |
| 4. | ORE-BAC CARRIER | 1.05 % |
| 5. | VITAMIN A TO PROVIDE 50,000 IU/LB | |
| 6. | VITAMIN D TO PROVIDE 12,500 IU/LB | |
| 7. | VITAMIN E TO PROVIDE 50 IU/LB | |
| 8. | ARTIFICIAL FLAVORING | .025 % |
| 9. | CONDENSED CORN DISTILLER SOLUBLES | 25 % |
| 10. | BEET MOLASSES | 50.61 % |

Fig. 2

CATTLEMAN'S CHOICE LOOMIX, L.L.C.

ORE-BAC SOUR

| ORDER | INGREDIENT | AMOUNT % |
|---|---|---|
| 1. | UREA SOLUTION 23% | 2.0% - 14.0 % |
| 2. | CONDENSED EXTRACTED GLUTAMIC ACID FERMENTATION PRODUCT | 10.0% - 60.0 % |
| 3. | ORE-BAC CARRIER | .50% - 3.0 % |
| 4. | SALT | 0.0% - 6.0 % |
| 5. | MAGNESIUM SULFATE | 0.0% - 1.5 % |
| 6. | CONDENSED MOLASSES FERMENTATION SOLUBLES | 5.0% - 60.0 % |
| 7. | BEET MOLASSES | 0.0% - 40.0 % |
| 8. | PHOSPHORIC ACID | 1.0% - 14.0 % |
| 9. | VITAMIN A TO PROVIDE 50,000 - 100,000 IU/LB | |
| 10. | VITAMIN D TO PROVIDE 5000 - 20,000 IU/LB | |
| 11. | VITAMIN E TO PROVIDE 10 - 300 IU/LB | |
| 12. | HYDROCHLORIC ACID (32%) AS NEEDED TO PROVIDE A FINAL pH OF .8 - 1.5 | |

ORE-BAC SWEET

| | INGREDIENT | AMOUNT % |
|---|---|---|
| 1. | WATER | 0.0% - 30.0 % |
| 2. | UREA SOLUTION 23% N | 0.0% - 12.0 % |
| 3. | AMMONIUM POLYPHOSPHATE (10-34-0) | 0.0% - 8.0 % |
| 4. | ORE-BAC CARRIER | .50% - 3.0 % |
| 5. | VITAMIN A TO PROVIDE 50,000 - 100,000 IU/LB | |
| 6. | VITAMIN D TO PROVIDE 5000 - 20,000 IU/LB | |
| 7. | VITAMIN E TO PROVIDE 10 - 300 IU/LB | |
| 8. | ARTIFICIAL FLAVORING | 0.0% - .75 % |
| 9. | CONDENSED CORN DISTILLER SOLUBLES | 0.0% - 40 % |
| 10. | BEET MOLASSES | 10.0% - 70.0 % |

Fig. 2a

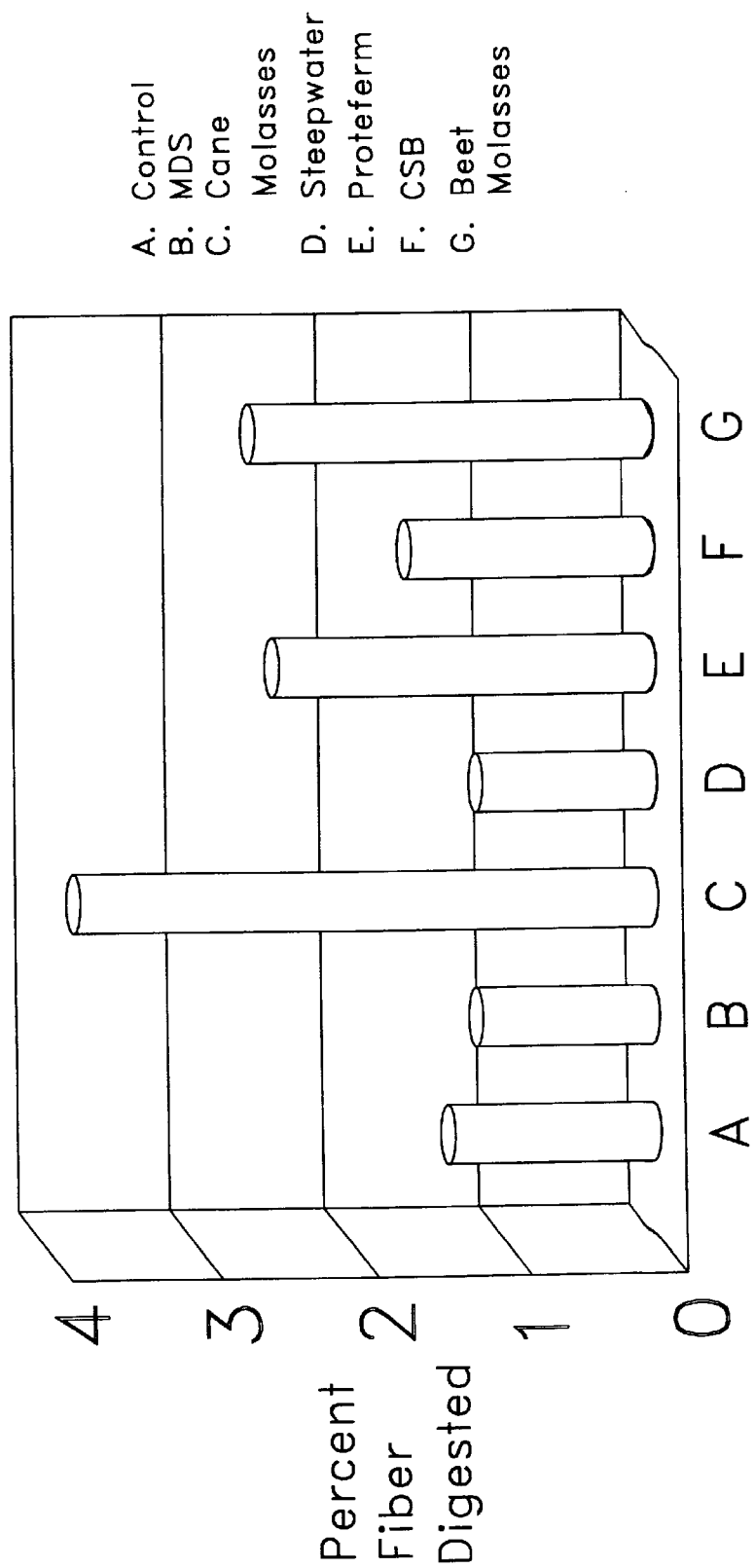

ADDITIVE

NUTRIENT PROFILE

| NUTRIENT | UNIT | ANALYSIS |
|---|---|---|
| COBALT | MG/LB | 197.00 |
| COPPER | MG/LB | 33510.00 |
| IODINE | MG/LB | 391.00 |
| IRON | MG/LB | 5020.00 |
| MANGANESE | MG/LB | 32622.00 |
| SELENIUM | MG/LB | 148.00 |
| ZINC | MG/LB | 43933 |

ELEMENTS ARE ALL DERIVED FROM THE SULFATE FORMS WITH THE EXCEPTION OF SELENIUM (SODIUM SELENITE) AND IODINE (ETHYLENEDIAMINE DIHYDRIODIDE). BREWERS YEAST IS INCLUDED AT THE RATE OF 250 POUNDS PER TON.

Fig. 4

ADDITIVE

NUTRIENT PROFILE

| NUTRIENT | UNIT | ANALYSIS |
|---|---|---|
| COBALT | MG/LB | 100 - 300 |
| COPPER | MG/LB | 20,000 - 50,000 |
| IODINE | MG/LB | 200 - 900 |
| IRON | MG/LB | 0 - 15,000 |
| MANGANESE | MG/LB | 10,000 - 60,000 |
| SELENIUM | MG/LB | 0 - 400 |
| ZINC | MG/LB | 10,000 - 60,000 |

ELEMENTS ARE ALL DERIVED FROM THE SULFATE FORMS WITH THE EXCEPTION OF SELENIUM (SODIUM SELENITE) AND IODINE (ETHYLENEDIAMINE DIHYDRIODIDE). BREWERS YEAST IS INCLUDED AT THE RATE OF 0 - 800 POUNDS PER TON.

Fig. 4a

CATTLEMAN'S CHOICE LOOMIX LIQUID FEED SUPPLEMENT
ORE-BAC   SWEET
FOR BEEF CATTLE CONFINED OR ON PASTURE AND LACTATING AND NON-LACTATING DAIRY CATTLE
GUARANTEED ANALYSIS

| | | |
|---|---|---|
| CRUDE PROTEIN | Not less than | 12.0 PCT |
| CRUDE PROTEIN EQUIVALENT FROM NPN | Not more than | 4.0 PCT |
| CRUDE FAT | Not less than | .0 PCT |
| CRUDE FIBER | Not more than | .2 PCT |
| PHOSPHORUS (P) | Not less than | .40 PCT |
| SALT (NACL) | Not less than | .9 PCT |
| SALT (NACL) | Not more than | 1.1 PCT |
| ZINC (ZN) | Not less than | 1016.0 PPM |
| COPPER (CU) | Not less than | 774.0 PPM |
| MANGANESE (MN) | Not less than | 753.0 PPM |
| COBALT (CO) | Not less than | 4.0 PPM |
| IODINE (I) | Not less than | 9.0 PPM |
| SELENIUM (SE) | Not less than | 3.0 PPM |
| VITAMIN A | Not less than | 50000.0 IU/LB |
| VITAMIN D | Not less than | 12500.0 IU/LB |
| VITAMIN E | Not less than | 50.0 IU/LB |
| MOISTURE | Not more than | 47.0 PCT |

INGREDIENTS

BEET MOLASSES, CONDENSED FERMENTED CORN EXTRACTIVES, UREA, AMMONIUM POLYPHOSPHATE, ZINC SULFATE, MANGANESE SULFATE, FERROUS SULFATE, COPPER SULFATE, MAGNESIUM SULFATE, COBALT SULFATE, ETHYLENEDIAMINE DIHYDRIODIDE, D-ACTIVATED ANIMAL STEROL, VITAMIN E ACETATE, ARTIFICIAL FLAVORING, VITAMIN A ACETATE, YEAST

FEEDING DIRECTION

1. FEED TO RUMINANTS ONLY.
2. SELF FEED ONLY WITH UNLIMITED ROUGHAGE, SALT AND WATER AVAILABLE.
3. OVERGRAZED PASTURES ARE NOT ADEQUATE FOR SELF-FEEDING.
4. IT IS NOT RECOMMENDED THAT MORE THAN 30% OF TOTAL PROTEIN INTAKE BE SUPPLIED BY PROTEIN EQUIVALENT FROM NON-PROTEIN-NITROGEN.

USE WITHIN 60 DAYS OF PURCHASE TO ASSURE VITAMIN EFFICACY.

WARNING: EXCESSIVE CONSUMPTION MAY RESULT IN ADVERSE TOXIC REACTION. USE ONLY AS DIRECTED.

Fig. 6

CATTLEMAN'S CHOICE LOOMIX LIQUID FEED SUPPLEMENT
ORE-BAC    SWEET

FOR BEEF CATTLE CONFINED OR ON PASTURE AND
LACTATING AND NON-LACTATING DAIRY CATTLE

GUARANTEED ANALYSIS

| | |
|---|---|
| CRUDE PROTEIN | 6.0 - 20.0 PCT |
| CRUDE PROTEIN EQUIVALENT FROM NP | 0.0 - 25.0 PCT |
| CRUDE FAT | 0.0 - 2.0 PCT |
| CRUDE FIBER | 0.0 - 1.0 PCT |
| PHOSPHORUS (P) | .20 - 3.0 PCT |
| SALT (NACL) | 0.0 - 8.0 PCT |
| ZINC (ZN) | 500 - 2000 PPM |
| COPPER (CU) | 200 - 1200 PPM |
| MANGANESE (MN) | 200 - 1500 PPM |
| COBALT (C0) | 0.0 - 8.0 PPM |
| IODINE (I) | 0.0 - 15.0 PPM |
| SELENIUM (SE) | 0.0 - 6.0 PPM |
| VITAMIN A | 20,000 - 90,000 IU/LB |
| VITAMIN D | 5,000 - 30,000 IU/LB |
| VITAMIN E | 0 - 300   IU/LB |
| MOISTURE | 30 - 60 PCT |

INGREDIENTS
CONDENSED FERMENTED CORN EXTRACTIVES, CONCENTRATED BEET SEPARATOR BY-PRODUCT, HYDROCHLORIC ACID, PHOSPHORIC ACID, UREA, SALT, ZINC SULFATE, BEET MOLASSES, MAGNESIUM SULFATE, MANGANESE SULFATE, FERROUS SULFATE, COBALT SULFATE, ETHYLENEDIAMINE DIHYDRIODIDE, D-ACTIVATED ANIMAL STEROL, VITAMIN E ACETATE, VITAMIN A ACETATE, YEAST

FEEDING DIRECTIONS
1. FEED TO RUMINANTS ONLY.
2. SELF FEED ONLY WITH UNLIMITED ROUGHAGE, SALT AND WATER AVAILABLE.
3. OVERGRAZED PASTURES ARE NOT ADEQUATE FOR SELF-FEEDING.
4. IT IS NOT RECOMMENDED THAT MORE THAN 30% OF TOTAL PROTEIN INTAKE BE SUPPLIED BY PROTEIN EQUIVALENT FROM NON-PROTEIN-NITROGEN.

USE WITHIN 60 DAYS OF PURCHASE TO ASSURE VITAMIN EFFICACY.

Fig. 6a

CATTLEMAN'S CHOICE LOOMIX LIQUID FEED SUPPLEMENT
ORE-BAC  BITTER

FOR BEEF CATTLE CONFINED OR ON PASTURE AND
LACTATING AND NON-LACTATING DAIRY CATTLE
<u>GUARANTEED ANALYSIS</u>

| | | |
|---|---|---:|
| CRUDE PROTEIN | Not less than | 25.0 PCT |
| CRUDE PROTEIN EQUIVALENT FROM NPN | Not more than | 18.0 PCT |
| CRUDE FAT | Not less than | .0 PCT |
| CRUDE FIBER | Not more than | .2 PCT |
| PHOSPHORUS (P) | Not less than | 2.00 PCT |
| SALT (NACL) | Not less than | 5.6 PCT |
| SALT (NACL) | Not more than | 6.6 PCT |
| ZINC (ZN) | Not less than | 1016.0 PPM |
| COPPER (CU) | Not less than | 774.0 PPM |
| MANGANESE (MN) | Not less than | 753.0 PPM |
| COBALT (CO) | Not less than | 4.0 PPM |
| IODINE (I) | Not less than | 9.0 PPM |
| SELENIUM (SE) | Not less than | 3.0 PPM |
| VITAMIN A | Not less than | 50000.0 IU/LB |
| VITAMIN D | Not less than | 12500.0 IU/LB |
| VITAMIN E | Not less than | 50.0 PCT |
| MOISTURE | Not more than | 47.0 PCT |

<u>INGREDIENTS</u>

CONDENSED FERMENTED CORN EXTRACTIVES, CONCENTRATED BEET SEPARATOR BY-PRODUCT, HYDROCHLORIC ACID, PHOSPHORIC ACID, UREA, SALT, ZINC SULFATE, BEET MOLASSES, MAGNESIUM SULFATE, MANGANESE SULFATE, FERROUS SULFATE, COPPER SULFATE, COBALT SULFATE, ETHYLENEDIAMINE DIHYDRIODIDE, D-ACTIVATED ANIMAL STEROL, VITAMIN E ACETATE, VITAMIN E ACETATE, VITAMIN A ACETATE, YEAST

<u>FEEDING DIRECTION</u>

1. FEED TO RUMINANTS ONLY.
2. SELF FEED ONLY WITH UNLIMITED ROUGHAGE, SALT AND WATER AVAILABLE.
3. OVERGRAZED PASTURES ARE NOT ADEQUATE FOR SELF-FEEDING.
4. IT IS NOT RECOMMENDED THAT MORE THAN 30% OF TOTAL PROTEIN INTAKE BE SUPPLIED BY PROTEIN EQUIVALENT FROM NON-PROTEIN-NITROGEN.

USE WITHIN 60 DAYS OF PURCHASE TO ASSURE VITAMIN EFFICACY.
WARNING: EXCESSIVE CONSUMPTION MAY RESULT IN ADVERSE TOXIC REACTION. USE ONLY AS DIRECTED.

Fig. 7

CATTLEMAN'S CHOICE LOOMIX LIQUID FEED SUPPLEMENT
ORE-BAC  BITTER

FOR BEEF CATTLE CONFINED OR ON PASTURE AND
LACTATING AND NON-LACTATING DAIRY CATTLE

GUARANTEED ANALYSIS

| | |
|---|---|
| CRUDE PROTEIN | 14.0 - 30.0 PCT |
| CRUDE PROTEIN EQUIVALENT FROM NPN | 0.0 - 25.0 PCT |
| CRUDE FAT | 0.0 - 2.0 PCT |
| CRUDE FIBER | 0.0 - 1.0 PCT |
| PHOSPHORUS (P) | 1.0 - 3.0 PCT |
| SALT (NACL) | 0.0 - 8.0 PCT |
| ZINC (ZN) | 500 - 2000 PPM |
| COPPER (CU) | 200 - 1200 PPM |
| MANGANESE (MN) | 200 - 1500 PPM |
| COBALT (C0) | 0.0 - 8.0 PPM |
| IODINE (I) | 0.0 - 15.0 PPM |
| SELENIUM (SE) | 0.0 - 6.0 PPM |
| VITAMIN A | 20,000 - 90,000 IU/LB |
| VITAMIN D | 5,000 - 30,000 IU/LB |
| VITAMIN E | 0 - 300 IU/LB |
| MOISTURE | 30 - 60 PCT |

INGREDIENTS

CONDENSED FERMENTED CORN EXTRACTIVES, CONCENTRATED BEET SEPARATOR BY-PRODUCT, HYDROCHLORIC ACID, PHOSPHORIC ACID, UREA, SALT, ZINC SULFATE, BEET MOLASSES, MAGNESIUM SULFATE, MANGANESE SULFATE, FERROUS SULFATE, COPPER SULFATE, COBALT SULFATE, ETHYLENEDIAMINE DIHYDRIODIDE, D-ACTIVATED ANIMAL STEROL, VITAMIN E ACETATE, VITAMIN A ACETATE, YEAST

FEEDING DIRECTIONS

1. FEED TO RUMINANTS ONLY.
2. SELF FEED ONLY WITH UNLIMITED ROUGHAGE, SALT AND WATER AVAILABLE.
3. OVERGRAZED PASTURES ARE NOT ADEQUATE FOR SELF-FEEDING.
4. IT IS NOT RECOMMENDED THAT MORE THAN 30% OF TOTAL PROTEIN INTAKE BE SUPPLIED BY PROTEIN EQUIVALENT FROM NON-PROTEIN-NITROGEN. USE WITHIN 60 DAYS OF PURCHASE TO ASSURE VITAMIN EFFICACY.

Fig. 7a

INCREASED FIBER DIGESTION LIVESTOCK SUPPLEMENT

This application claims the priority benefit of the provisional application (Application No. 60/090,672) filed on Jun. 25, 1998. The contents of that application are hereby incorporated by reference.

BACKGROUND

The field of the invention relates to improved digestion of livestock. Specifically, it relates to improved digestion by liquid feed in ruminate animals.

There have been numerous research reports published on the ability of various protein amounts and types to increase the amount of feed an animal consumes ("intake"). It is assumed that the resulting increased intake is a result of increased fiber digestion. The ruminant animal has the ability to digest and utilize roughages because of the animal's design. The rumen is actually similar to a fermentation vat. It contains various bacteria and enzymes that digest these roughages. The animal in turn digests the bacteria, which provides the main source of nutrition. These bacteria are of various types, depending on the diet the animal is consuming and can have lifespans from 20 minutes to 12 hours. Because the lifespans are relatively short, to optimize the amount of these bacteria, the animal needs to be able to feed these bacteria with the proper form and type of nutrients on a consistent basis.

Recent research by the National Research Council (NRC) has found that the nutrient levels of cattle needed to be changed as evident by the revision of the NRC manual from 1984 to 1996. The NRC is an independent group of scientists who are dedicated to the furtherance of science and technology and has a mandate that requires it to advise the federal government on scientific and technical matters. It has been generally accepted that the NRC's nutrient requirements are the minimal level required by livestock and that these levels may need to be adjusted upwards depending on the environment and genetics of the livestock. Proper nutrient levels and genetic research available has been published in the Journal of Animal Science and obtained from various universities. Most of the research performed has been on either degradable or undegradable protein sources as exhibited in references (Lehrschall et al., 1997; Lusweti et al., 1997; Orias et al., 1997; Marston et al., 1997; Brown and Pate, 1997; Köster et al., 1997). The typical theory behind this research is that rumen microorganisms require a certain amount and type of protein to grow and multiply; by changing the amount or type of protein, animal performance can be altered. Protein and/or protein type have proven to have an impact on animal digestion and intakes. However, a continuing problem with most types of supplementation is the consistent and timely intake of the protein supplement. Range beef cows are generally not fed a total mixed ration where the amount of protein is insured. They are typically supplemented with a form of protein supplement (either liquid or dry) that has to be controlled by either a mechanical or "free choice" approach. The majority of supplemented cattle are fed once per day using a volume approach that provides the supplement all at once (i.e. 2 lbs. per head times 100 head=200 pounds offered to all the cattle at one time). Given the short life of bacteria and considering other factors, these methods have consistently exhibited problems providing the animals with a consistent intake of the supplement.

Another approach that has been used with much more success has been that of offering the supplement while controlling the supplement's palatability. This method has typically been used with liquid supplements and has only truly been successful if the proper mixing order and formulation are known and used.

Another approach that has been used to increase fiber digestion has been the addition of additives. The major focus of research has been the use of various enzymes to enhance digestion as exhibited in references (Fondevila and Dehority, 1996; Lewis et al., 1996; Varel et al.,; Varel and Kreikemeier, 1994). This method has had varying levels of success, but continues to exhibit the same type of problems that protein supplementation experienced. Additives success is directly related to the amount and frequency of consumption by the ruminant animal. If the correct amount is supplied on a consistent basis, the results tend to be more positive. However, because these additives are supplied through a more traditional supplement as described previously, consistent intakes of the supplement are not assured.

Although various attempts have been made and perhaps much research has been performed, there remains a need for a practical solution not only to the method of supplementation, but also to the formulation of the supplementation itself. The solution would be to provide the ruminant animal with the proper form of nutritional components that will increase intake and digestibility on a more consistent basis. This type of supplementation should allow the animal to increase the amount of fiber digesting bacteria and thus increase its performance while grazing natural resources. It should also provide the proper plane of nutrition that the animal requires to achieve its full genetic potential.

SUMMARY OF THE INVENTION

It is a goal of this invention to increase the amount of fiber a ruminant animal consumes and its efficiency. The present invention includes a specific formulation of ingredients, nutrients and characteristics that tend to increase the amount of fiber that ruminant animals are able to digest. The invention seeks to provide these ingredients and nutrients in the proper order and time, in a liquid medium to the animal at a controlled rate. The invention contains ingredients that have been selected based on their ability by themselves to increase fiber digestion as determined by in-vitro trials. It also contains specifically selected levels of individual minerals and vitamins that have been determined to enhance animal intake performance. Another goal of the product is to provide needed micro nutrition that has been determined to enhance performance. It is also goal of the invention to provide rumen bacteria with the needed levels of protein to allow them to grow and multiply. The invention contains various types of protein at a ratio that has been proven to be successful in increasing ruminant digestive performance. Another goal of the invention is to provide a medium, such as an additive, that encourages rumen bacterial growth. Still another goal of the invention to provide a given level of nutrients and to provide for a given medium on a consistent and timely basis. The invention has been formulated with the proper ratios of ingredients to provide control over the amount that an animal consumes on a daily basis.

BRIEF DESCRIPTION OF THE DRAWINGS

FIG. 2 provides lists of ingredients of the Cattleman's Choice Loomix sour and sweet supplements in specific amounts and orders.

FIG. 2a provides lists of ingredients of the Cattleman's Choice Loomix sour and sweet supplements in ranges and orders.

FIG. 3 shows liquid ingredient fiber digestion capabilities.

FIG. 4 is a list of the nutrient profile in specific amounts in the additive used in this invention.

FIG. 4a is a list of the nutrient profile in ranges in the additive used in this invention.

FIG. 6 is a feed tag showing the ingredients of the Cattleman's Choice Loomix liquid feed sweet supplement in specified amounts.

FIG. 6a is a feed tag showing the ingredients of the Cattleman's Choice Loomix liquid feed sweet supplement in ranges.

FIG. 7 is a feed tag showing the ingredients of the Cattleman's Choice Loomix liquid feed bitter supplement in specified amounts.

FIG. 7a is a feed tag showing the ingredients of the Cattleman's Choice Loomix liquid feed bitter supplement in ranges.

DETAILED DESCRIPTION OF THE PREFERRED EMBODIMENTS

As can be easily understood, the basic concepts of the present invention may be embodied in a variety of ways. It involves both feeding techniques as well as the formulation to accomplish the appropriate feeding. In this application, the feeding techniques are disclosed as part of the results shown to be achieved by the various formulation described and as steps which may be inherent to utilization. They may be simply the natural result of utilizing the techniques as intended and described. In addition, while some formulations and operations are disclosed, it would be understood that these not only accomplish certain methods but also can be varied in a number of ways. Importantly, as to all of the foregoing, all of these facets should be understood to be encompassed by this disclosure.

The invention's differentiation, in part, is a result of the use of ingredients that are outside the logical interpretation of the results presented in FIG. 3. Liquid ingredients have typically been selected for use depending on their cost and palatability. Beet or cane molasses have typically been used because of their sweet taste to livestock. Recently, several liquid feed companies have selected ingredients because of the protein content they carried. We decided to run a trial to determine the fiber digesting capabilities of each of the ingredients commonly used to manufacture liquid feed. Logical thinking by one with ordinary skill in the art would indicate that the ingredient, which showed the greatest ability to digest fiber by itself, such as cane molasses, would in turn prove to be the best if included in a completed supplement.

Our invention differs from this logical process thinking. Instead, we elected to formulate a product that used a greater percentage of ingredients that actually showed less favorable digestion results as raw ingredients, when tested individually. We suspected that the proper combination of these ingredients might prove to provide better fiber digestion results than any one ingredient by itself.

The present invention includes a variety of aspects, which may be combined in different ways. Each of these aspects is first discussed separately. In the preferred embodiment, the order of micro and macro ingredients is important (FIGS. 2, 4, 6 and 7). However, other orders and ranges could be appropriate and produce satisfactory results (such as shown in FIGS. 2a, 4a, 6a and 7a).

Figure 1:
FIG. 1 shows the Cattleman's Choice Loomix supplement feeding container.

As shown in FIG. 1, the invention is offered to the animal in an open trough design. This method of offering supplementation to cattle may increase the possibility that all cattle have access to the supplement. The trough may be of various sizes and materials. Metal troughs have the potential to cause adverse reactions to the invention and should be avoided. Given the short life of bacteria discussed above, a goal of this method of supplementation may be to increase the physical amount of invention material that is available to animals, which in turn may increase the probability that all animals have equal access to the invention.

The macro ingredients used to formulate the invention have been derived from sources that may increase rumen bacterial growth. These ingredients may be composed of molasses (either or both beet and cane), condensed molasses fermentation solubles (derived from the de-sugaring of either beet or cane molasses), condensed extracted glutamic acid fermentation products (derived from the production of mono-sodium glutamate), condensed corn distiller solubles (derived from the production of ethanol and or corn fructose sweeteners). In the preferred embodiment, these ingredients may be blended in a given ratio as shown in FIG. 2. The goal of this may be to provide the amount of the ingredients that may have a greater probability to enhance fiber digestion over other ingredients when combined in a given ratio. FIG. 3 shows the fiber digesting effectiveness of the various liquids as determined by in-vitro testing by an independent laboratory. These ingredients may also have an impact on the palatability of the invention. The combination of the ingredients (both macro and micro) may have an impact on the invention's ability to perform. The ingredient order of inclusion, both macro and micro, is depicted in FIG. 2. The goal of this may be to insure the ingredients do not produce an undesirable chemical reaction and/or reduce the possible effectiveness of the invention.

Figure 5:
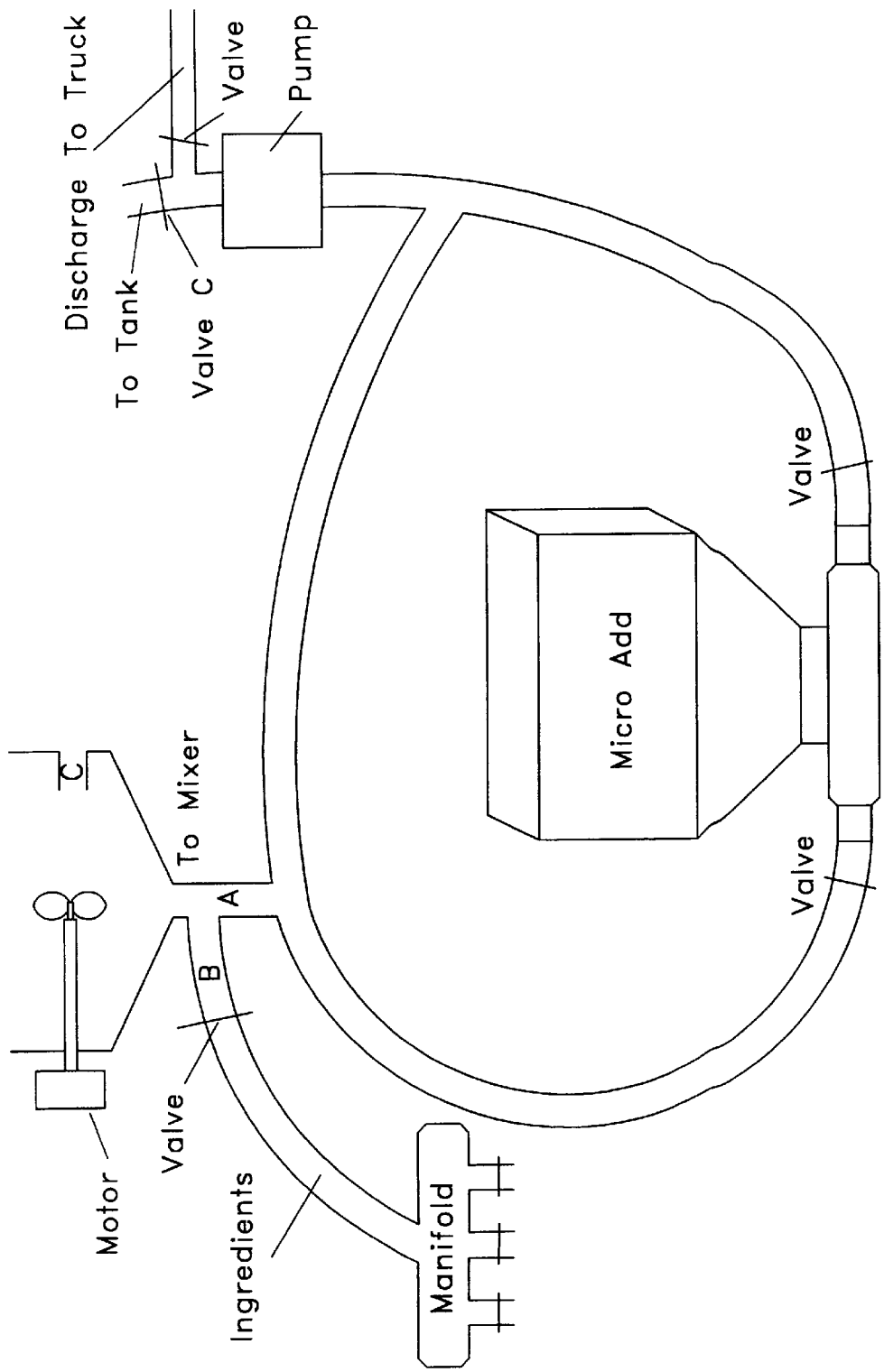
FIG. 5 shows the system used in this invention.

The addition of the invention's micro ingredients may also have an impact on the performance of this unique formulation and such is detailed in FIG. 4. The goal may be to provide the rumen bacteria with a favorable environment in which to grow and multiply. The method in which the micro nutrients are included into the invention may have an impact on the effectiveness of the solubility of the nutrients within the invention. This method is detailed in FIG. 5. Generally, as would be known to those with skill in the art, the liquid feed supplement is mixed in a tank and allowed to somewhat continuously flow through a flow loop past a micro ingredient container that may slowly add the micro ingredients so that they go into solution. A goal of the invention may be to provide nutrients through the invention in a soluble form, which may reduce the possibility that the nutrients would separate out of the invention and become unavailable to the animal.

The invention may be comprised of two products, that when combined together, could have the ability to more effectively control the volume of the invention that cattle consume at any one time. One of the products may have a final pH between 0.8 to 1.5, while the other product may have a much higher pH that may not be of importance. Regarding palatability, a goal would be to have one product that would be bitter to the animal and therefore potentially limit the amount of the invention the animal would consume. It would also be a very sweet product that would potentially encourage consumption. These two products may then be blended together, at the trough, to control the animals' consumption at a desired level. These products are shown in FIGS. 6 and 7 respectively. Another goal of the invention may be to provide essential nutrients and elements that may increase the fiber digesting performance of ruminant animals in a controlled amount that may be available 24 hour a day.

Figure 8:
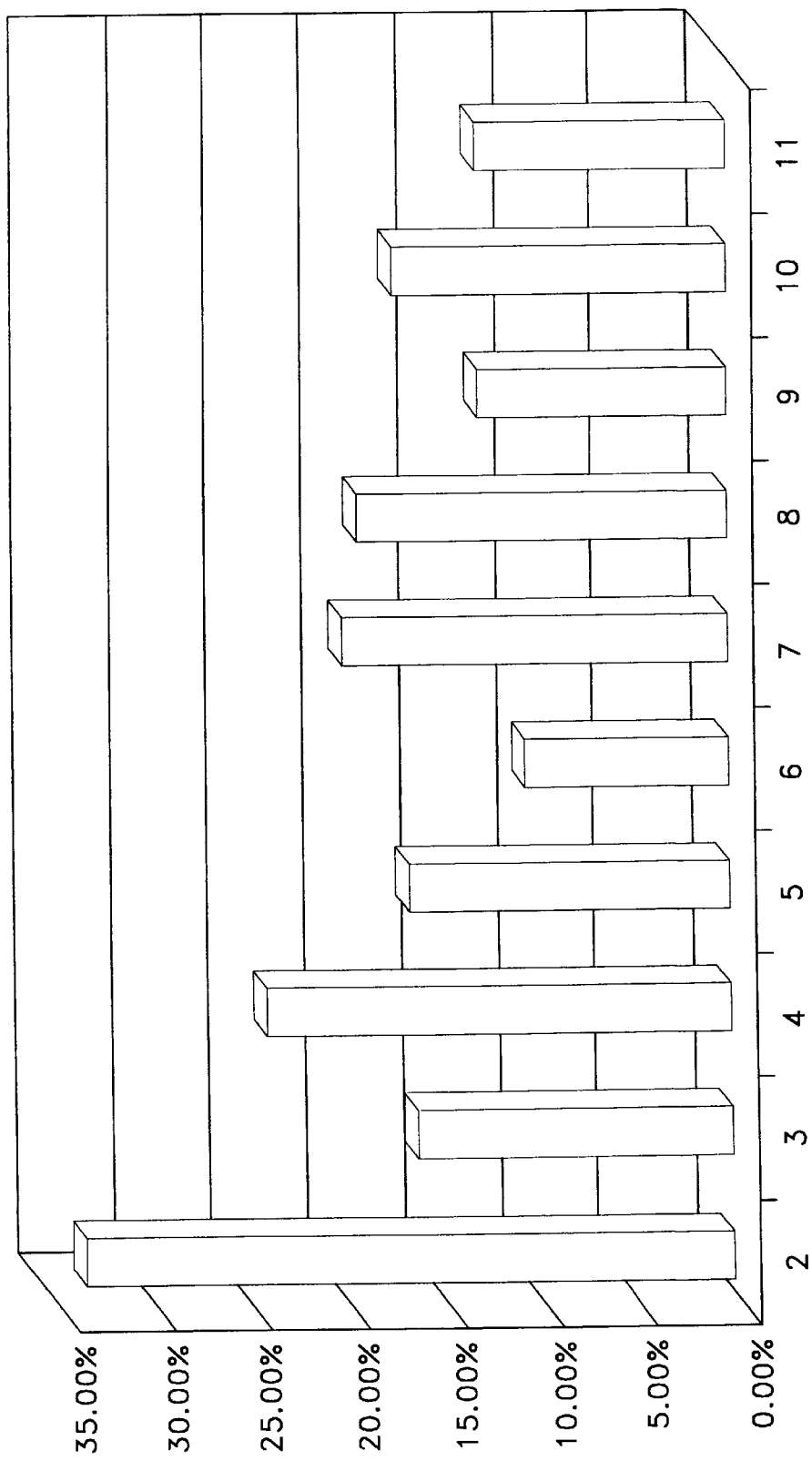
FIG. 8 plots the percentage increase in fiber digested versus control.
Figure 9:
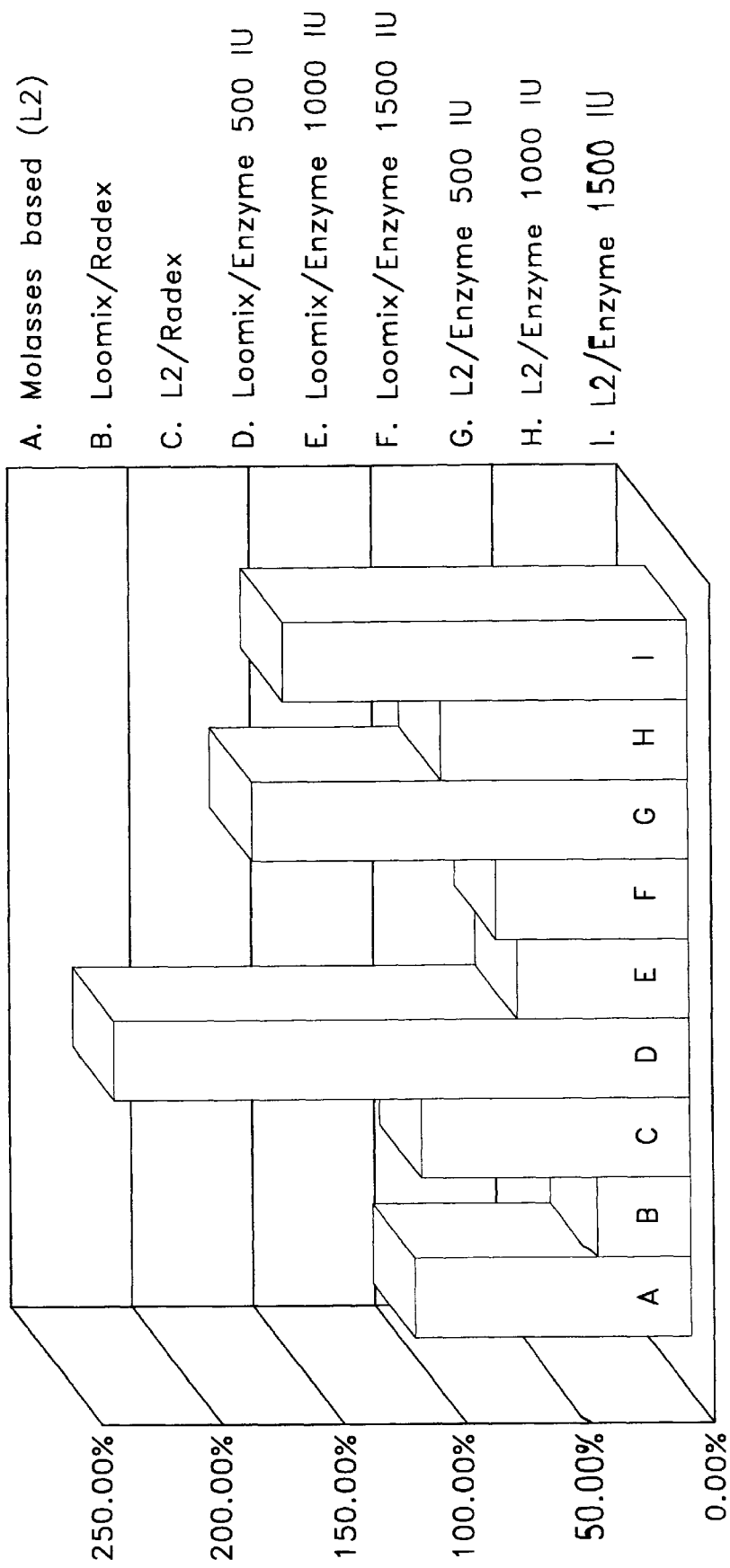
FIG. 9 plots the percentage increase in fiber digestion of Loomix versus others.

The invention and its formulation have produced spectacular results. The potential effectiveness of this invention to achieve the fiber digesting goals above are shown in FIGS. 8 and 9. FIG. 8 graphs the results of the invention (shown as sample #2) as compared to other similar products in the marketplace or in testing that may or may not have contained additives against a control. FIG. 9 graphs the advantage the invention showed over the other products themselves. An independent laboratory through in-vitro trials performed testing of these ingredients.

As can be easily understood from the foregoing, the basic concepts of the present invention may be embodied in a variety of ways. It involves both enhanced fiber digestion techniques as well as formulations to accomplish the appropriate enhanced fiber digestion. In this application, the enhanced fiber digestion techniques are disclosed as part of the results shown to be achieved by the various formulations described and as steps which are inherent to utilization. They are simply the natural result of utilizing the formulations as intended and described. In addition, while some formulations are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in formulation-oriented terminology, each element of the formulation implicitly performs a function. Apparatus claims may not only be included for the formulation described, but also method or process claims may be included to address the functions the invention and each element performs. Where the invention is described in formulation-oriented terminology, each element of the formulation implicitly performs a function. Formulation discussions or claims may not only be included for the formulation described, but also method or process claims may be included to address the functions the invention and each element performs. Although the formulation related to the system are being included in various detail, only an initial discussion directed toward the methods of feeding the formulations have been included. Naturally, that discussion could have some application to the various other methods and apparatus discussed throughout the disclosure. This is particularly true for the present invention since its basic concepts and understandings may be broadly applied. Neither the description nor the terminology is intended to limit the scope of the claims included in this full patent application.

It should also be understood that a variety of changes may be made without departing from the essence of the invention. Such changes are also implicitly included in the description. They still fall within the scope of this invention.

This full patent application seeks examination of as broad a base of claims as deemed within the applicant's right and is designed to yield a patent covering numerous aspects of the invention both independently and as an overall system.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, the disclosure of a "supplement" should be understood to encompass disclosure of as but one example, the act of "supplementing"—whether explicitly discussed or not—and, conversely, were there only disclosure of the act of "supplementing", such a disclosure should be understood to encompass disclosure of a "supplement." Such changes and alternative terms are to be understood to be explicitly included in the description.

All references in the disclosure filed with the application are hereby incorporated by reference; however, to the extent statements might be considered inconsistent with the patenting of this/these invention(s) such statements are expressly not to be considered as made by the applicant(s).

Thus, the applicant(s) should be understood to claim at least: I) a livestock feed formulation as herein disclosed and described, ii) the related methods disclosed and described, iii) similar, equivalent, and even implicit variations of each of these formulations and methods, iv) those alternative formulations which accomplish each of the functions shown as are disclosed and described, v) those alternative formulations and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, and x) the various combinations and permutations of each of the elements disclosed.

We claim:

1. An increased fiber digestion livestock supplement, comprising the following ingredients:
   a. between about 2 and 14% by amount urea solution with 23% nitrogen;
   b. between about 10 and 60% by amount condensed extracted glutamic acid fermentation product;
   c. between about 0.5 and 3% by amount additive, comprising cobalt, copper, iodine, iron, manganese, selenium, zinc and brewer's yeast;
   d. up to about 6% by amount salt;
   e. up to about 1.5% by amount Magnesium sulfate;

f. between about 5 and 60% by amount condensed molasses fermentation solubles;

g. up to about 40% by amount beet molasses;

h. between about 50,000 and 100,000 IU per pound vitamin A;

I. between about 5,000 and 20,000 IU per pound vitamin D;

j. between about 10 and 300 IU per pound vitamin E; and k. an appropriate amount of 32% hydrochloric acid to provide a final pH of 0.8–1.5.

2. An increased fiber digestion livestock supplement as described in claim 1 wherein each of said ingredients is added in the following order:

a. between about 2 and 14% by amount urea solution with 23% nitrogen;

b. between about 10 and 60% by amount condensed extracted glutamic acid fermentation product;

c. between about 0.5 and 3% by amount additive;

d. up to about 6% by amount salt;

e. up to about 1.5% by amount Magnesium sulfate;

f. between about 5 and 60% by amount condensed molasses fermentation solubles;

g. up to about 40% by amount beet molasses;

h. between about 50,000 and 100,000 IU per pound vitamin A;

I. between about 5,000 and 20,000 IU per pound vitamin D;

j. between about 10 and 300 IU per pound vitamin E; and then k. an appropriate amount of 32% hydrochloric acid to provide a final pH of 0.8–1.5.

3. An increased fiber digestion livestock supplement as described in claim 1 wherein the specific amount of each of said ingredients is:

a. 7.15% by amount urea solution with 23% nitrogen;

b. 40% by amount condensed extracted glutamic acid fermentation product;

c. 1.05% by amount additive;

d. 2.41% by amount salt;

e. 0.25% by amount Magnesium sulfate;

f. 27.55% by amount condensed molasses fermentation solubles;

g. 0.467% by amount beet molasses;

h. 50,000 IU per pound vitamin A;

I. 12,500 IU per pound vitamin D;

j. 50 IU per pound vitamin E; and k. an appropriate amount of 32% hydrochloric acid to provide a final pH of 0.8–1.5.

4. An increased fiber digestion livestock supplement as described in claim 3 wherein each of said ingredients is added in the following order:

a. 7.15% by amount urea solution with 23% nitrogen;

b. 40% by amount condensed extracted glutamic acid fermentation product;

c. 1.05% by amount additive;

d. 2.41% by amount salt;

e. 0.25% by amount Magnesium sulfate;

f. 27.55% by amount condensed molasses fermentation solubles;

g. 0.467% by amount beet molasses;

h. 50,000 IU per pound vitamin A;

I. 12,500 IU per pound vitamin D;

j. 50 IU per pound vitamin E; and then k. an appropriate amount of 32% hydrochloric acid to provide a final pH of 0.8–1.5.

5. An increased fiber digestion livestock supplement, comprising the following ingredients:

a. up to about 30% by amount water;

b. up to about 12% by amount urea solution with 23% nitrogen;

c. up to about 8% Ammonium polyphosphate (10-34-0);

d. between about 0.5 and 3.0% by amount additive, comprising cobalt, copper, iodine, iron, manganese, selenium, zinc and brewer's yeast;

e. between about 50,000–100,000 IU per pound vitamin A;

f. between about 5,000 and 20,000 IU per pound vitamin D;

g. between about 10 and 300 IU per pound vitamin E;

h. up to about 0.75% artificial flavoring;

I. up to about 40% condensed corn distiller solubles; and j. between about 10 and 70% by amount beet molasses.

6. An increased fiber digestion livestock supplement as described in claim 5 wherein each of said ingredients is added in the following order:

a. up to about 30% by amount water;

b. up to about 12% by amount urea solution with 23% nitrogen;

c. up to about 8% Ammonium polyphosphate (10-34-0);

d. between about 0.5 and 3.0% by amount additive;

e. between about 50,000–100,000 IU per pound vitamin A;

f. between about 5,000 and 20,000 IU per pound vitamin D;

g. between about 10 and 300 IU per pound vitamin E;

h. up to about 0.75% artificial flavoring;

I. up to about 40% condensed corn distiller solubles; and j. between about 10 and 70% by amount beet molasses.

7. An increased fiber digestion livestock supplement as described in claim 5 wherein the specific amount of each of said ingredients is:

a. 20.38% by amount water;

b. 1.83% by amount urea solution with 23% nitrogen;

c. 1.05% Ammonium polyphosphate (10-34-0);

d. 1.05% by amount additive;

e. 50,000 IU per pound vitamin A to provide;

f. 12,500 IU per pound vitamin D;

g. 50 IU per pound vitamin E;

h. 0.025% artificial flavoring;

I. 25% condensed corn distiller solubles; and then j. 50.61% by amount beet molasses.

8. An increased fiber digestion livestock supplement as described in claim 7 wherein each of said ingredients is added in the following order:

a. 20.38% by amount water;

b. 1.83% by amount urea solution with 23% nitrogen;

c. 1.05% Ammonium polyphosphate (10-34-0);

d. 1.05% by amount additive;

e. 50,000 IU per pound vitamin A to provide;

f. 12,500 IU per pound vitamin D;

g. 50 IU per pound vitamin E;

h. 0.025% artificial flavoring;

I. 25% condensed corn distiller solubles; and then j. 50.61% by amount beet molasses.

9. An increased fiber digestion livestock supplement, said supplement having an additive, wherein said additive comprises the following ingredients:
   a. between about 100 and 300 mg per pound by weight cobalt;
   b. between 20,000 and 50,000 mg per pound by weight copper;
   c. between 200 and 900 mg per pound by weight iodine;
   d. up to about 15,000 mg per pound by weight iron;
   e. up to about 10,000 and 60,000 mg per pound by weight manganese;
   f. up to about 400 mg per pound by weight selenium;
   g. up to about 10,000 and 60,000 mg per pound by weight zinc; and
   h. up to about 800 pound per ton by weight brewers yeast.

10. An increased fiber digestion livestock supplement as described in claim 9 wherein each of said ingredients is added in the following order:
    a. between about 100 and 300 mg per pound by weight cobalt;
    b. between 20,000 and 50,000 mg per pound by weight copper;
    c. between 200 and 900 mg per pound by weight iodine;
    d. up to about 15,000 mg per pound by weight iron;
    e. up to about 10,000 and 60,000 mg per pound by weight manganese;
    f. up to about 400 mg per pound by weight selenium;
    g. up to about 10,000 and 60,000 mg per pound by weight zinc; and then
    h. up to about 800 pound per ton by weight brewers yeast.

11. An increased fiber digestion livestock supplement as described in claim 9 wherein the specific amount of each of said ingredients is:
    a. 197 mg per pound by weight cobalt;
    b. 33510 mg per pound by weight copper;
    c. 391 mg per pound by weight iodine;
    d. 5020 mg per pound by weight iron;
    e. 32622 mg per pound by weight manganese;
    f. 148 mg per pound by weight selenium;
    g. 43933 mg per pound by weight zinc; and
    h. 250 pound per ton by weight brewers yeast.

12. An increased fiber digestion livestock supplement as described in claim 11 wherein each of said ingredients is added in the following order:
    a. 197 mg per pound by weight cobalt;
    b. 33510 mg per pound by weight copper;
    c. 391 mg per pound by weight iodine;
    d. 5020 mg per pound by weight iron;
    e. 32622 mg per pound by weight manganese;
    f. 148 mg per pound by weight selenium;
    g. 43933 mg per pound by weight zinc; and then
    h. 250 pound per ton by weight brewers yeast.

* * * * *